United States Patent
Murray

(10) Patent No.: US 11,436,032 B2
(45) Date of Patent: Sep. 6, 2022

(54) BLOCKCHAIN-BASED CONTAINER IMAGE REGISTRY

(71) Applicant: Red Hat, Inc., Raleigh, NC (US)

(72) Inventor: Dylan Murray, Wake Forest, NC (US)

(73) Assignee: Red Hat, Inc., Raleigh, NC (US)

( * ) Notice: Subject to any disclaimer, the term of this patent is extended or adjusted under 35 U.S.C. 154(b) by 450 days.

(21) Appl. No.: 16/566,469

(22) Filed: Sep. 10, 2019

(65) Prior Publication Data

US 2021/0073019 A1     Mar. 11, 2021

(51) Int. Cl.
| | | |
|---|---|---|
| G06F 9/455 | (2018.01) | |
| H04L 9/06 | (2006.01) | |
| H04L 9/00 | (2022.01) | |

(52) U.S. Cl.
CPC ........ *G06F 9/45558* (2013.01); *H04L 9/0637* (2013.01); *H04L 9/0643* (2013.01); *G06F 2009/45587* (2013.01); *H04L 9/50* (2022.05)

(58) Field of Classification Search
CPC ....... G06F 9/45558; G06F 2009/45587; G06F 8/63; G06F 2009/45562; H04L 9/0637; H04L 9/0643; H04L 2209/38; H04L 9/3239
See application file for complete search history.

(56) References Cited

U.S. PATENT DOCUMENTS

| | | | | |
|---|---|---|---|---|
| 10,999,060 | B2 * | 5/2021 | Zhuo | ..................... H04L 9/0643 |
| 2015/0261801 | A1 * | 9/2015 | Barton | ................ G06F 16/1744 |
| | | | | 707/697 |
| 2017/0180346 | A1 * | 6/2017 | Suarez | .................... G06F 21/53 |
| 2018/0131581 | A1 | 5/2018 | DeLuca et al. | |
| 2018/0343111 | A1 | 11/2018 | Chen et al. | |
| 2019/0050541 | A1 | 2/2019 | Wright et al. | |
| 2019/0057362 | A1 | 2/2019 | Wright et al. | |

(Continued)

FOREIGN PATENT DOCUMENTS

| | | |
|---|---|---|
| WO | 2017/145004 A1 | 8/2017 |
| WO | 2017/145047 A1 | 8/2017 |

(Continued)

OTHER PUBLICATIONS

Deploying the REST server for a business network/Hyperledger Composer; retrieved Apr. 29, 2019; https://ibm-blockchain.github.io/develop/integrating/deploying-the-rest-server (1 page).

(Continued)

*Primary Examiner* — Robert B Leung
*Assistant Examiner* — Bruce S Ashley
(74) *Attorney, Agent, or Firm* — K&L Gates LLP

(57) ABSTRACT

Methods and systems for storing and retrieving container images are provided. In one embodiment, a method is provided including receiving a container image, which may include executable code, and dividing the container image into a plurality of image parts. One or more image upload transactions may then be generated, and each of the image upload transactions may include at least one of the plurality of image parts. The image upload transactions may be stored on the blockchain. The image upload transactions may also include a unique identifier generated to link the plurality of image upload transactions.

18 Claims, 7 Drawing Sheets

(56) References Cited

U.S. PATENT DOCUMENTS

| | | |
|---|---|---|
| 2019/0102409 A1 | 4/2019 | Shi et al. |
| 2020/0310775 A1* | 10/2020 | Nyamars ............. G06F 16/1824 |
| 2020/0351650 A1* | 11/2020 | Maria ................. H04W 12/033 |
| 2020/0387367 A1* | 12/2020 | Eklund ................ H04L 9/0637 |

FOREIGN PATENT DOCUMENTS

| | | | |
|---|---|---|---|
| WO | 2018141363 A1 | 8/2018 | |
| WO | WO-2019101232 A2 * | 5/2019 | ......... G06F 16/2365 |

OTHER PUBLICATIONS

DaoCloud/daochain; Docker image verification system based on Ethereium; https://github.com/DaoCloud/daochain; retrieved Apr. 29, 2019 (5 pages).

Decentralized Content Trust for Docker Images; Xu et al; Data Storage Institute, a *STAR, Singapore; IoTBDS 2017—2nd International Conference on Internet of Things, Big Data and Security; https://www.scitepress.org/papers/2017/63794/63794.pdf; retrieved Apr. 29, 2019; pp. 431-437.

* cited by examiner

BLOCKCHAIN-BASED CONTAINER IMAGE REGISTRY

BACKGROUND

Container images may store executable code in an unchanging format. Container images may also store other data (e.g., data relevant to executing the executable code). Container images may be used to execute code in a self-contained manner within a computing device and/or computing infrastructure. Once created, container images can be distributed to other computing systems. Because container images are self-contained, distributed container images may typically be capable of execution on various computing systems without further configuration of the container image for the receiving computing system.

SUMMARY

The present disclosure presents new and innovative systems and methods for storing and retrieving container images. In one embodiment, a method is provided that includes receiving a container image including executable code and dividing the container image into a plurality of image parts. The method may further include generating a plurality of image upload transactions and each image upload transaction may include at least one image part. The plurality of image upload transactions may then be stored on the blockchain. Each image upload transaction may also include a unique identifier generated to link the plurality of image upload transactions.

In another embodiment, a system is provided that includes a system and a memory. The memory may store instructions which, when executed by the processor, cause the processor to receive a container image including executable code and divide the container image into a plurality of image parts. The instructions, when executed by the processor, may further cause the processor to generate a plurality of image upload transactions, and each image upload transaction may include at least one image part. The instructions, when executed by the processor, may also cause the processor to store the plurality of image upload transactions on a blockchain. Each image upload transaction may also include a unique identifier generated to link the image upload transactions.

In a further embodiment, a computer-readable medium may be provided storing instructions which, when executed by a processor, cause the processor to receive a container image including executable code and divide the container image into a plurality of image parts. The instructions, when executed by the processor, may further cause the processor to generate a plurality of image upload transactions, and each image upload transaction may include at least one image part. The instructions, when executed by the processor, may also cause the processor to store the plurality of image upload transactions on a blockchain. Each image upload transaction may also a unique identifier generated to link the image upload transactions.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
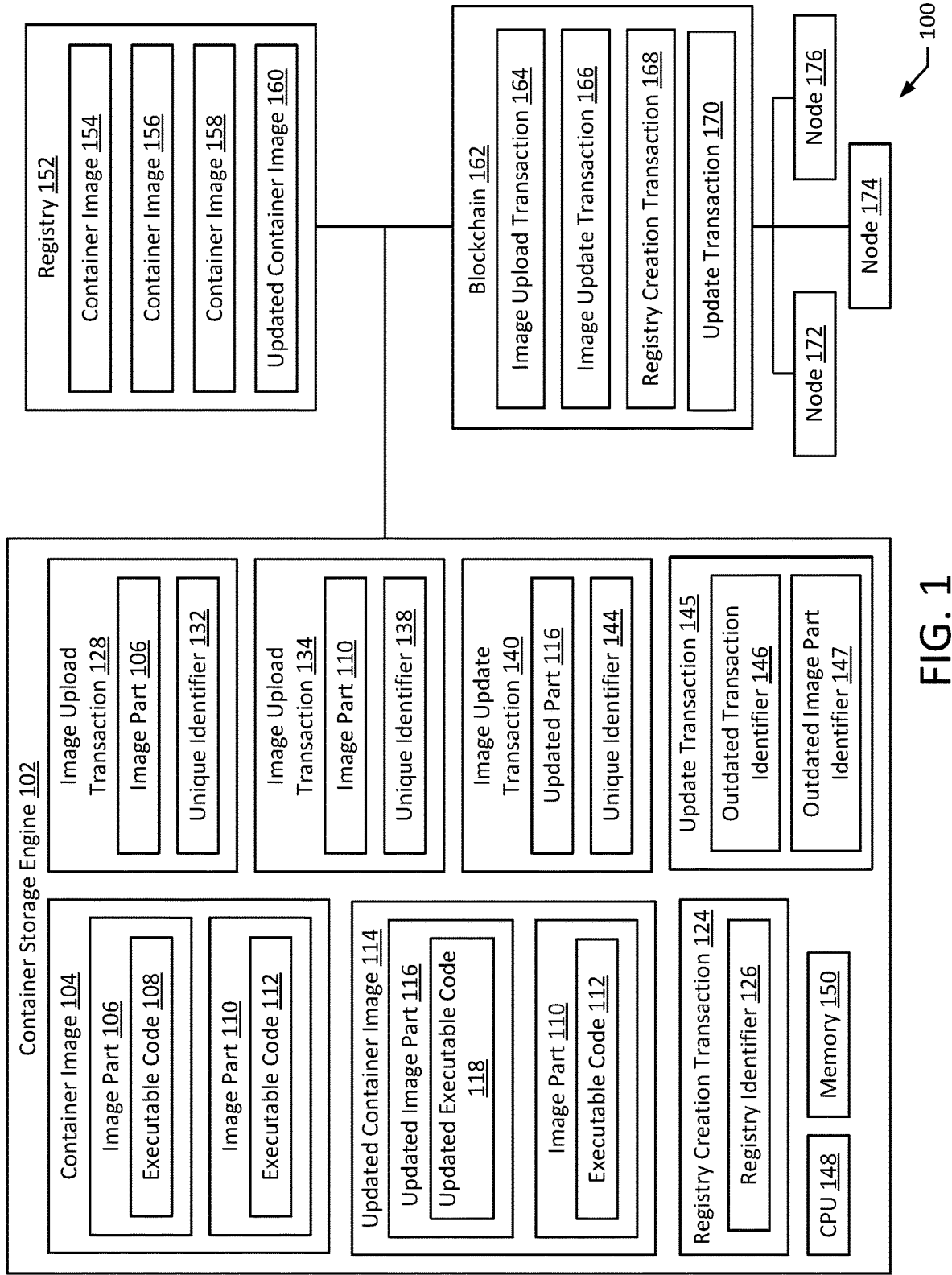
FIG. 1 illustrates a system according to an exemplary embodiment of the present disclosure.

Container images may be stored in a container registry for distribution. For example, a user of one computing system may create and store a container image on the container registry so that other computing systems can access the container image (e.g., download and execute the container image). In certain instances, the container registry may be public facing, allowing users to store container images for public access and download, or for semi-public access by a limited number of other users. Users may therefore be able to develop a useful container image (e.g., a container image executing a useful function for computer development or other computing purposes). Other users may than access the useful container image for free or, in certain implementations, for money. In other instances, the container registry may be private, storing container images for users' own use. For example, an organization may utilize a private container registry to store container images for distribution within the organization.

Container registries may, in certain implementations, be hosted by the user. For example, a user may host a public or private container registry on a computing machine or on computing hardware that the user maintains. However, such implementations may require excessive setup and maintenance time and may require large amounts of storage and network bandwidth. In other implementations, the container registries may be hosted by third-party registry providers, such as Docker Hub® and the Quay container registry from Red Hat®, that provide and maintain the necessary computing hardware and bandwidth. However, such third-party registry providers may charge ongoing storage fees. In instances where such fees are not paid, third-party registry providers may also prune stored images after a predetermined period of time, or when a user stores more than a predetermined amount of data with the third-part provider.

In either instance, there exists a need to store container images in a public or private manner without the possibility of images being pruned against the user's wishes, but also avoids the complexities of a user having to set up and maintain their own container registry. At the same time, such a storage system should also avoid the storage constraints and ongoing storage fees of third-party container registry providers.

One solution to the above-identified problems is to provide a blockchain-based container registry that stores container images in one or both of a public and private manner. The container images may be stored within one or more image upload transactions that are stored on the blockchain. In certain instances, container images may be split into multiple image parts, which are uploaded with separate image upload transactions. In such instances, the image upload transactions may include unique identifiers that link image upload transactions storing image parts from the received container image. These unique identifiers may include hashes generated based on previous upload transactions. Alternatively, the unique identifiers may include spending (or otherwise utilizing) the output of a previous image upload transaction to upload a subsequent image upload transaction for storage on the blockchain. The image upload transactions may be either or both publicly and privately visible. Accordingly, the blockchain may be searched for image upload transactions corresponding to a certain type of container image. In this way, users may be able to identify desired container images for download and execution. In certain instances, container images stored on the blockchain via image upload transactions may need to be updated. These updates may be performed by identifying an image upload transaction that stores an outdated part of the container image and replacing the outdated part using an updated image upload transaction storing an updated image part of the container image.

FIG. 1 illustrates a system 100 according to an exemplary embodiment of the present disclosure. The system 100 may be configured to prepare container images to generate image upload transactions for storage on a blockchain. The system 100 includes a container storage engine 102, a registry 152, and a blockchain 162. The registry 152 stores container images 154, 156, 158. The container images 154, 156, 158 may store executable code for distribution execution on one or more computing devices. In certain instances, the container images 154, 156, 158 may be updated. For example, the executable code contained within a container images 154, 156, 158 may be changed and/or additional data (e.g., dependencies, stored data, configuration settings) may be updated. In such instances, an updated container image 160 may be generated. In certain implementations, the updated container image 160 may replace a preceding container image. For example, if the updated container image 160 represents an updated version of the container image 154, the updated container image 160 may replace the container image 154 in the registry 152. In other implementations, the updated container image 160 may be stored alongside an earlier container image 154, as depicted in FIG. 1.

The container storage engine 102 may be configured to prepare container images 104 for preparation and storage on the blockchain 162. For example, the container storage engine 102 may receive container images 154, 156, 158 from the registry 152. Alternatively, the container image 104 may be received from a user. For example, the user may provide the container image 104 to the container storage engine 102 without storing the container image 104 on the registry 152. Such implementations may enable more direct preparation storage of container images 104 on the blockchain 162.

The container image 104 includes multiple image parts 106, 110. The image parts 106, 110 may correspond to a portion of the container image 104. For example, each of the image parts 106, 110 may store a portion of executable code 108, 112 of the overall container image 104. In certain implementations, container storage engine 102 may divide the container image 104 into image parts 106, 110. For example, the container storage engine 102 may divide the container image 104 into image parts 106, 110 according to predefined divisions within the container image 104 or according to other requirements (e.g., maximum size restrictions per transaction), as explained further below. The container storage engine 102 may prepare image upload transactions 128, 134 storing the container image 104. For example, as depicted, each image part 106, 110 of the container image 104 may be contained within a separate image upload transaction 128, 134. In other implementations, the container image 104 may be stored within a single image upload transaction 128. In implementations where the container image 104 is stored on multiple image upload transactions 128, 134, each image upload transaction 128, 134 storing an image part 106, 110 of the container image 104 may also contain a unique identifier 132, 138. The unique identifier 132, 138 may be generated to link the image upload transactions 128, 134 corresponding to the container image 104. For example, the unique identifier 132, 138 may link its corresponding image upload transaction 128, 134 to a previously-uploaded image upload transaction 128, 134 corresponding to the same container image 104. Once prepared, the image upload transactions 128, 134 may be transmitted to the blockchain 162 for storage.

The container storage engine 102 may also be configured to prepare updated container images 114 for storage on the blockchain 162. For example, the container storage engine 102 may receive an updated container image 160 from registry 152. Alternatively, the updated container image 114 may be received from a user (e.g., a user providing the updated container image 114 for storage on the blockchain 162), as discussed above regarding the container image 104. The updated container image 114 may contain an updated image part 116 containing updated executable code 118. For example, the updated executable code 118 and the updated container image 114 may add or remove features to a previous container image 104 and/or may patch or fix bugs or other issues in a previous container image 104. The updated container image 114 may also, however, contain image parts 110 containing executable code 112 which are not updated. For example, as depicted, the updated container image 114 may be an updated version of the container image 104. In particular, the updated image part 116 may be an updated version of the image part 106 and the updated executable code 118 may be an updated version of the executable code 108. However, the image part 110 is not updated by the updated container image 114. Accordingly, the updated container image 114 contains an unaltered image part 110 containing the same executable code 112 as the container image 104.

The container storage engine 102 may be configured to generate an image update transaction 140 based on the updated container image 114 for storage on the blockchain 162. For example, because the updated container image 114 includes only a single updated image part 116, the container storage engine 102 may generate the image update transaction 140 to include only the updated part 116, as depicted. As the image part 110 of the updated container image 114 is already stored on the blockchain 162 by the image upload transaction 134, the container storage engine 102 may not generate another transaction storing the image part 110 on the blockchain 162, to save storage space. As with the image upload transactions 128, 134, the image update transaction 140 may include a unique identifier 144. The unique identifier 144 may be generated to link the image update transaction 140 with the image upload transactions 128, 134 corresponding to the container image 104 of which the updated container image 114 represents an updated version. Additionally, in implementations where multiple updated versions of the updated container image are processed for the same initial container image, subsequent image update transactions may contain unique identifiers linking the image update transactions to the preceding image update transaction. In particular, if, after the container storage engine 102 receives a subsequent updated container image (e.g., updating the image part 110), the container storage engine 102 may generate a subsequent image update transaction containing a unique identifier that links the subsequent image update transaction to the image update transaction 140.

In addition to generating an image update transaction 140, the container storage engine 102 may also be configured to generate an update transaction 145 corresponding to a received updated container image 114. The update transaction 145 may include an outdated transaction identifier 146 identifying an image upload transaction 128 containing an image part 106 which the updated part 116 of the image update transaction 140 replaces. Additionally or alternatively, where multiple updates to the same image part are enacted by multiple updated container images, the outdated transaction identifier 146 may also identify an image update transaction 140 that is outdated (e.g., that has been superseded or replaced by a subsequent image update transaction). The outdated transaction identifier 146 may identify the outdated transaction using one or more identifiers (e.g., the unique identifier 132, 138, 144, a transaction identifier generated upon storage of the transaction 128, 134, 140 on the blockchain 162, or other identifiers associated with the transaction 128, 134, 140). The update transaction 145 may also include an outdated updated image part identifier 147 identifying an image part 106, 110 (or updated image part 116) replaced by the image update transaction 140. The updated image part identifier 147 may identify the outdated image part according to an image part identifier, or a combination of other identifiers (e.g., an identifier of the container image 104 and an ordering of the outdated image part within the container image 104). For example, as depicted, the first image part 106 of the container image 104 is updated by the updated image part 116. Accordingly, the outdated image part identifier 147 may identify the outdated image part 106 as the first image part of the container image 104. The image part ordering is discussed in greater detail below with FIG. 2. In certain implementations, the image update transaction 140 and the update transaction 145 may be implemented as a single transaction uploaded to the blockchain 162 for storage. For example, the image update transaction 140 may include the updated part 116, the unique identifier 144, the outdated transaction identifier 146, and the outdated image part identifier 147. In still further implementations, one or both of the outdated transaction identifier 146 and the outdated image part identifier 147 may be optional. For example, the update transaction 145 may only identify the outdated transaction identifier 146 and may not include an outdated image part identifier 147. Accordingly, the outdated image part may be determined by identifying the image part contained within the transaction corresponding to the outdated transaction identifier 146.

The container storage engine 102 may also generate a registry creation transaction 124. The registry creation transaction 124 may include a registry identifier 126. The registry identifier 126 may correspond to a particular registry (e.g., a registry created by a user or an organization). For example, a user may create a registry by generating a new registry identifier 126 and uploading a registry creation transaction 124 for storage on the blockchain 162. Container images 104 and/or updated container images 114 may then be stored within the registry by including the registry identifier 126 within corresponding transactions (e.g., image upload transactions 128, 134, image update transactions 140, update transactions 145). The registry identifier 126 may have associated privacy controls. For example, container images 104 and/or updated container images 114 stored in association with the registry identifier 126 may be accessible to the public, or only to one or more users associated with the registry identifier. In particular, the image parts 106, 110 and updated image parts 116 may be uploaded using encryption keys. These encryption keys may be stored separately from the image upload transactions 128, 134 and image update transaction 140 in a key management system (e.g., on a separate key management system managed by an organization or individual affiliated with the registry identifier 126 and/or a distributed key management). Authorized users may therefore be allowed access to the relevant encryption keys through the key management system to encrypt and utilize the container images 104 and/or updated container images 114, while unauthorized users may remain unable to decrypt the container images 104 and/or updated container images 114. In this way, the container storage engine 102 may enable the creation of both public and private registries without requiring users to upload container images 104 and updated container images 114 to centralized, third-party providers. Further, users are able to create new registries without undergoing the labor-intensive registry set up processes mentioned above, and without having to perform burdensome maintenance tasks. Rather, the container images 104 and updated container images 114 are stored in and unchangeable formats, preserved by virtue of the verification and preservation protocols (e.g., the consensus protocols) of the blockchain 162, discussed further below.

In certain implementations, the registry identifier 126 may alternatively indicate an external storage location of container images 154, 156, 158 stored by a registry 152. For example, rather than storing container images 154, 156, 158 in image upload transaction 128, 134, the container storage engine 102 may store the container images 154, 156, 158 in the registry 152 and may store image upload transactions 128, 134 without image parts. These image upload transactions 128, 134 may therefore serve to indicate the availability of the container images 154, 156, 158 and may include the registry identifier 126 to indicate where the available container images 154, 156, 158 are stored. In such implementations, an image update transaction 140 corresponding to the updated container image 160 stored in the registry may similarly lack an updated image part and may include the registry identifier 126 indicating the storage location of the updated container image 160 (e.g., the registry 152).

The blockchain 162 may store transactions, such as image upload transactions 164, image update transactions 166, registry creation transactions 168, and update transactions 170. The blockchain 162 may also store additional types of transactions external to the operation of the container storage engine 102. The blockchain 162 may be implemented by one or more nodes 172, 174, 176. For example, transactions uploaded for storage to the blockchain 162 may be verified by the nodes 172, 174, 176. In particular, the nodes 172, 174, 176 may validate received transactions according to one or more consensus protocols (e.g., proof of stake consensus protocols or proof of work consensus protocols). According to these consensus protocols, the nodes 172, 174, 176 may maintain copies of all transactions uploaded to the blockchain 162. Accordingly, once uploaded, copies of the transactions 164, 166, 168, 170 may be maintained by the nodes 172, 174, 176. Further, in order for the consensus protocols to function properly, these copies may need to be maintained in an unchanging format. Therefore, the copies of the transactions 164, 166, 168, 170 maintained by the nodes 172, 174, 176 may be relied upon as accurate copies of the transactions 164, 166, 160, 170, and the image parts 106, 110, updated parts 116, and other information contained within. In certain implementations, the blockchain 162 may be implemented by one or more cryptocurrency blockchains (e.g., the Bitcoin blockchain and/or the Ethereum® blockchain).

One or more of the container storage engine 102, the registry 152, the blockchain 162, and the nodes 172, 174, 176 may be implemented at least in part by a computer system. For example, the CPU 148 and the memory 150 of the container storage engine 102 may implement one or more features of container storage engine 102. In particular, the memory 150 may contain instructions which, when executed by the CPU 148, cause the CPU 148 to implement one or more of the operational features of the container storage engine 102. Similarly, although not depicted, one or more of the registry 152, the blockchain 162, and the nodes 172, 174, 176 may contain a CPU and/or a memory similarly configured to implement their respective operational features.

Figure 2:
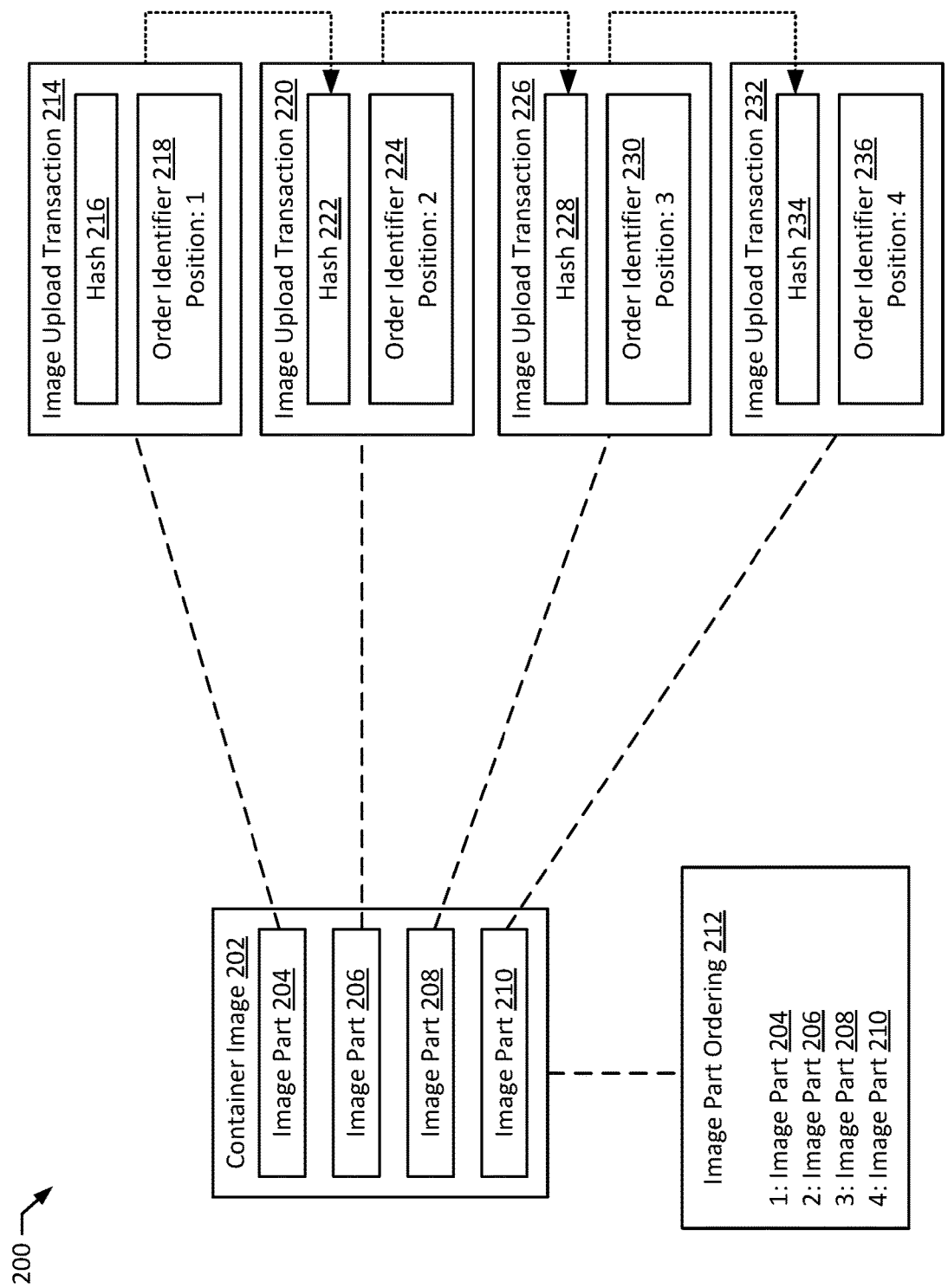
FIG. 2 illustrates a transaction generation operation according to an exemplary embodiment of the present disclosure.

FIG. 2 illustrates a transaction generation operation 200 according to an exemplary embodiment of the present disclosure. The transaction generation operation 200 may be an exemplary implementation of the container storage engine 102 generating a plurality of image upload transactions 214, 220, 226, 232 to store a container image 202. In certain implementations, the transaction generation operation 200 may depict an operation performed by the container storage engine 102. For example, the container storage engine 102 may perform a similar operation to generate the image upload transactions 128, 134 for the container image 104.

The container image 202 contains multiple image parts 204, 206, 208, 210. Each of the image parts 204, 206, 208, 210 may include executable code, similar to the image parts 106, 110 of the container image 104. Within the container image 202, the image parts 204, 206, 208, 210 may be stored in a specific order within the container image 202. In particular, proper execution of the container image 202 may require that image part 204 is stored before image part 206, which is stored before image part 208, which is stored before image part 210. Accordingly, the container image 202 may also include an associated image part ordering 212. The image part ordering may identify the proper order or sequence of the image parts 204, 206, 208, 210, which may be identified by an image part identifier. As depicted, the image part ordering 212 indicates that the image part 204 comes first, the image part 206 comes second, the image part 208 comes third, and the image part 210 comes fourth.

To store the container image 202 on a blockchain 162, multiple image upload transactions 214, 220, 226, 232 may be generated. In particular, a separate image upload transaction 214, 220, 226, 232 may be generated for each image part 204, 206, 208, 210 of the container image 202. For example, as depicted, the image upload transaction 214 corresponds to the image part 204, the image upload transaction 220 corresponds to the image part 206, the image upload transaction 226 corresponds to the image part 208, and the image upload transaction 232 corresponds to the image part 210. As depicted in FIG. 1, the image upload transactions 214, 220, 226, 232 may store their corresponding image parts 204, 206, 208, 210 (e.g., copies of the corresponding image parts) and unique identifier 132, 138. For example, the image upload transactions 214, 220, 226, 232 include hashes 216, 222, 228, 234, which may be an implementation of the unique identifiers 132, 138.

The hashes 216, 222, 228, 234 may be generated to link the image upload transactions 214, 220, 226, 232. In particular, the hashes 216, 222, 228, 234 may be generated to link image upload transactions 220, 226, 232 to previous image upload transactions 214, 220, 226 associated with an earlier image part 204, 206, 208. For example, as depicted, the hash 222 may be generated to link the image upload transaction 220 to the image upload transaction 214, the hash 228 may be generated to link the image upload transaction 226 to the image upload transaction 220, and the hash 234 may be generated to link the image upload transaction 232 to the image upload transaction 226.

In certain implementations, the hashes 222, 228, 234 may be generated based on all or part of the contents of the previous image upload transaction 214, 220, 226. For example, the hash 222 may be generated based on all of the contents of the image upload transaction 214 (e.g., the hash 216, the order identifier 218, and the image part 204). In another example, the hash 222 may be generated based on part of the contents of the image upload transaction 214 (e.g., the hash 216). In addition to the contents of the image upload transaction 214, the hash 222 may also be generated based at least in part on the contents of the image upload transaction. For example, the hash 222 may also be generated at least in part based on the image part 206, in addition to the contents of the image upload transaction 214. Typically, in preferred implementations, the hash 222 for the image upload transaction 220 may be generated at least in part based on the hash 216 of the preceding image upload transaction 214 and the image part 206 of the image upload transaction 220. The hashes 228, 234 may be similarly generated based at least partially on the contents of the image upload transaction 220, 226, respectively.

In alternative implementations, the image upload transactions 220, 226, 232 may be linked using proceeds of uploading a preceding image upload transaction 214, 220, 226. For example, after uploading the image upload transaction 214, the container storage engine 102 may receive ledger data corresponding to the upload operation, such as one or more of (i) cryptocurrency and (ii) a cryptographic identifier of the image upload transaction 220. In situation (i), the image upload transaction 220 may be uploaded using the received cryptocurrency. For example, uploading a transaction to the blockchain 162 may require compensation of a certain amount of cryptocurrency (e.g., to compensate operators of the nodes 172, 174, 176 for verification and storage of the transaction). The received cryptocurrency may therefore be used to offset for at least part of the required compensation. The received cryptocurrency may be individually identified, allowing for tracing of the proceeds from uploading the image upload transaction 214 to the upload of the image upload transaction 220, and so on for the image upload transactions 226, 232. In situation (ii), the received cryptographic identifier may be used as the hash 222, or as an input into the hash generation protocol to generate the hash 222.

The image upload transactions 214, 220, 226, 232 also include order identifiers 218, 224, 230, 236. The order identifiers 218, 224, 230, 236 may indicate a position of the corresponding image part 204, 206, 208, 210, according to the image part ordering 212. When the image upload transactions 214, 220, 226, 232 are retrieved from the blockchain 162 (e.g., by a subsequent user accessing the container image 202), the image upload transactions 214, 220, 226, 232 may be received out of order. The image parts 204, 206, 208, 210 contained within the image upload transaction 214, 220, 226, 232 may still be recombined into the container image 202, but may be required to be combined in the correct order (e.g., stored in the correct order in a copy of the container image 202), according to the image part ordering 212. Therefore, it may be necessary to indicate the position of each image part 204, 206, 208, 210 within its corresponding image upload transaction 214, 220, 226, 232.

In alternative implementations, the image part ordering 212 itself, or a copy thereof, may be included within one or more of the image upload transactions 214, 220, 226, 232. For example, the image part ordering 212 may be included within the image upload transaction 214 corresponding to the first image part 204. As another example, a copy of the image part ordering 212 may be included within each image upload transaction 214, 220, 226, 232.

In still further implementations, order identifiers 218, 224, 230, 236 may not be included in the image upload transactions 214, 220, 226, 232. For example, the image parts 206, 208, 210 may be encrypted at least in part using the hash 216, 222, 228 of a preceding image upload transaction 214, 220, 226. In such instances, access may be functionally restricted by not including order identifiers 218, 224, 230, 236 such that a user who downloads the encrypted image parts must know the proper order of the image parts 204, 206, 208, 210 to identify the correct hash 216, 222, 228, 234 and properly decrypt encrypted image parts. Such access controls may be used to restrict access to stored image parts to, e.g., employees within an organization that stored the container image 202 and therefore has access to the proper ordering information and/or a user or group of users responsible for storing the container image 202.

Figure 3:
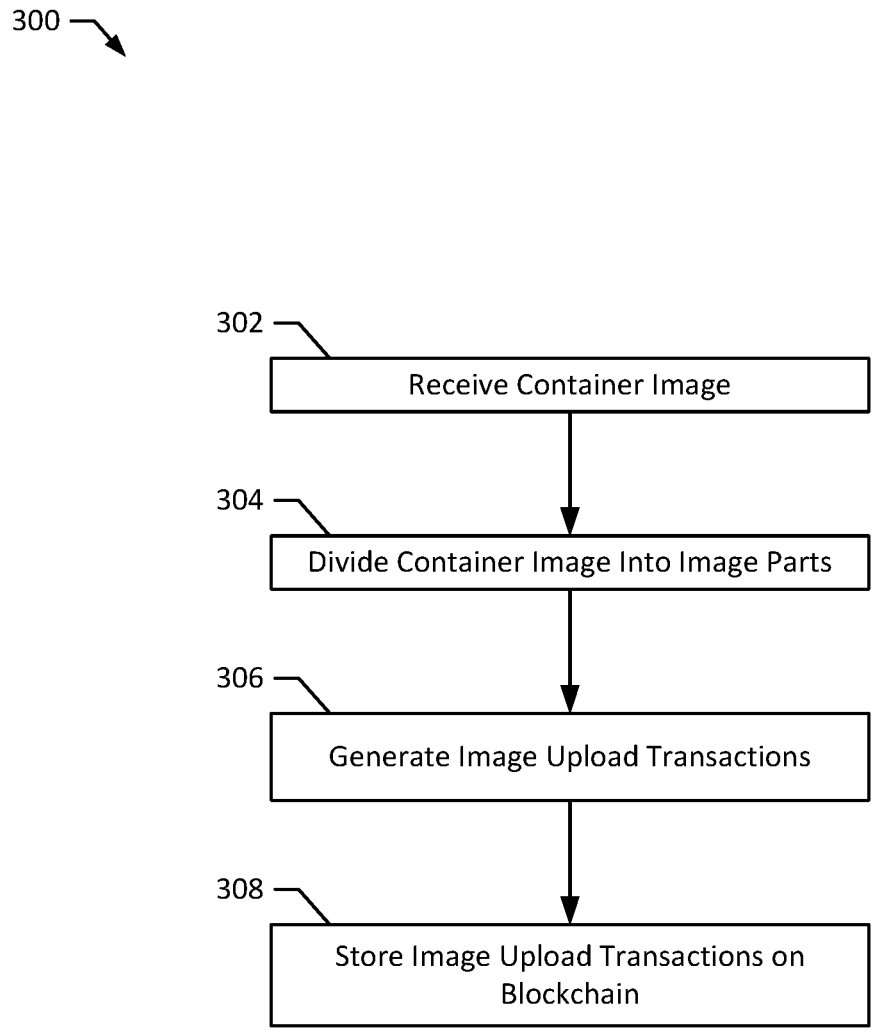
FIG. 3 illustrates a method according to an exemplary embodiment of the present disclosure.

FIG. 3 illustrates a method 300 according to an exemplary embodiment of the present disclosure. The method 300 may be performed to receive and prepare a container image 104, 202 for storage on the blockchain 162. The method 300 may be implemented on a computer system, such as the system 100. For example, the method 300 may be implemented by the container storage engine 102, the registry 152, and the blockchain 162. The method 300 may also be implemented by a set of instructions stored on a computer readable medium that, when executed by a processor, cause the computer system to perform the method. For example, all or part of the method 300 may be implemented by the CPU 148 and the memory 150. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 begins with receiving a container image (block 302). For example, the container storage engine 102 may receive a container image 104, 202 for storage on the blockchain 162. The container image 104, 202 may be received from a registry 152. For example, the container image 104, 202 may be stored on a private or local registry (e.g., associated with an organization or an individual developer). The container image 104, 202 may be developed and/or updated on the registry 152 prior to storage on the blockchain 162. Once ready for storage on the blockchain 162 (e.g., public access), the container image 104, 202 may be provided to the container storage engine 102 for preparation. In other implementations, a user may provide the container image 104, 202 directly for upload (e.g., in implementations where the container storage engine 102 is not communicatively coupled to a registry 152 and/or where the container image 104, 202 is not stored on the registry 152).

The container image may then be divided into image parts (block 304). For example, the container storage engine 102 may divide the container image 104, 202 into one or more image parts 106, 110, 204, 206, 208, 210. The container storage engine 102 may divide the container image according to one or more predefined divisions of the container image 104, 202. For example, the container image 104, 202 may have been built including one or more binary large objects (blobs). Each of these blobs may store executable code 108, 112 and/or other data necessary for execution of the container 104, 202. The container storage engine 102 may accordingly divide the container image 104, 202 based on the existing blobs. Namely, each blob may be considered an image part 106, 110, 206, 208, 210. The container storage engine 102 may additionally or alternatively divide the container image 104, 202 into image parts 106, 110, 206, 208, 210 according to one or more storage or performance requirements. For example, the container storage engine 102 may divide the container image 104, 202 into image parts 106, 110, 206, 208, 210 with a size at or below a predetermined threshold (e.g., 1 GB, 500 MB, 50 MB, 10 MB). In another example, the container storage engine may divide the container image 104, 202 into a predetermined number of image parts 106, 110, 206, 208, 210. In certain implementations, the above techniques may be combined. For example, the container storage engine 102 may initially divide the container image 104, 202 into image parts 106, 110, 206, 208, 210 according to predefined divisions. However, if one or more of the image parts 106, 110, 206, 208, 210 may have a size exceeding a predetermined threshold, such image parts 106, 110, 206, 208, 210 may accordingly be further split into image parts 106, 110, 206, 208, 210 with sizes less than the predetermined threshold.

The method 300 may then proceed with generating image upload transactions (block 306). For example, the container storage engine 102 may generate image upload transactions 128, 134, 214, 220, 226, 232 based on the image parts 106, 110, 206, 208, 210. As explained previously, the image upload transaction 128, 134, 214, 220, 226, 232 may each contain at least one image part 106, 110, 206, 208, 210. For example, each image part 106, 110, 206, 208, 210 may have a corresponding image upload transaction 128, 134, 214, 220, 26, 232 generated, as discussed above. In other implementations, certain image upload transactions 128, 134, 214, 220, 226, 232 may include more than one image part 106, 110, 206, 208, 210. For example, the container storage engine 102 may combine more than one image part 106, 110, 206, 208, 210 for storage in a single image upload transaction 128, 134, 214, 220, 226, 232 until a predetermined storage threshold is reached (e.g., 1 GB, 500 MB, 50 MB, 5 MB). In other implementations, and as will be explained further below, the image upload transaction 128, 134, 214, 220, 226, 232 may not include an image part 204, 206, 208, 210. For example, rather than storing a copy of the image part 106, 110, 204, 206, 208, 210, the image upload transaction 128, 134, 214, 220, 226, 232 may store an indication of a storage location of the image part 106, 110, 204, 206, 208, 210 (e.g., a storage location of the image part 206, 206, 208, 210 in a registry 152, a centralized or decentralized repository, or another storage system).

The image upload transactions 128, 134, 214, 220, 226, 232 may also store additional information beyond the image part 106, 110, 204, 206, 208, 210. For example, and as discussed previously, the image upload transactions 128, 134, 214, 220, 226, 232 may include one or more of a unique identifier 132, 138, a hash 218, 224, 230, 236, and an order identifier 218, 224, 230, 236. In certain implementations one or more of the unique identifier 132, 138 and the hash 218, 224, 230, 236 may be generated to link the image upload transactions 128, 134, 214, 220, 226, 232 to other image upload transactions 128, 134, 214, 220, 226, 232 generated from the same container image 202.

The image upload transactions may then be stored on the blockchain (block 308). For example, after generating the image upload transactions 128, 134, 214, 220, 226, 232, the container storage engine 102 may transmit the image upload transactions 128, 134, 214, 220, 226, 232 to the nodes 172, 174, 176 for verification and storage on the blockchain 162. Once verified by the nodes 172, 174, 176 (e.g., according to a consensus protocol among the nodes 172, 174, 176), the nodes 172, 174, 176 may append the image upload transactions 128, 134, 214, 220, 226, 232 to the blockchain 162 for storage. In certain implementations, the image upload transactions 128, 134, 214, 220, 226, 232 may be transmitted to the nodes 172, 174, 176 separately and/or in sequence (e.g., where the image upload transactions 128, 134, 214, 220, 226, 232 are uploaded in sequence).

Figure 4A:
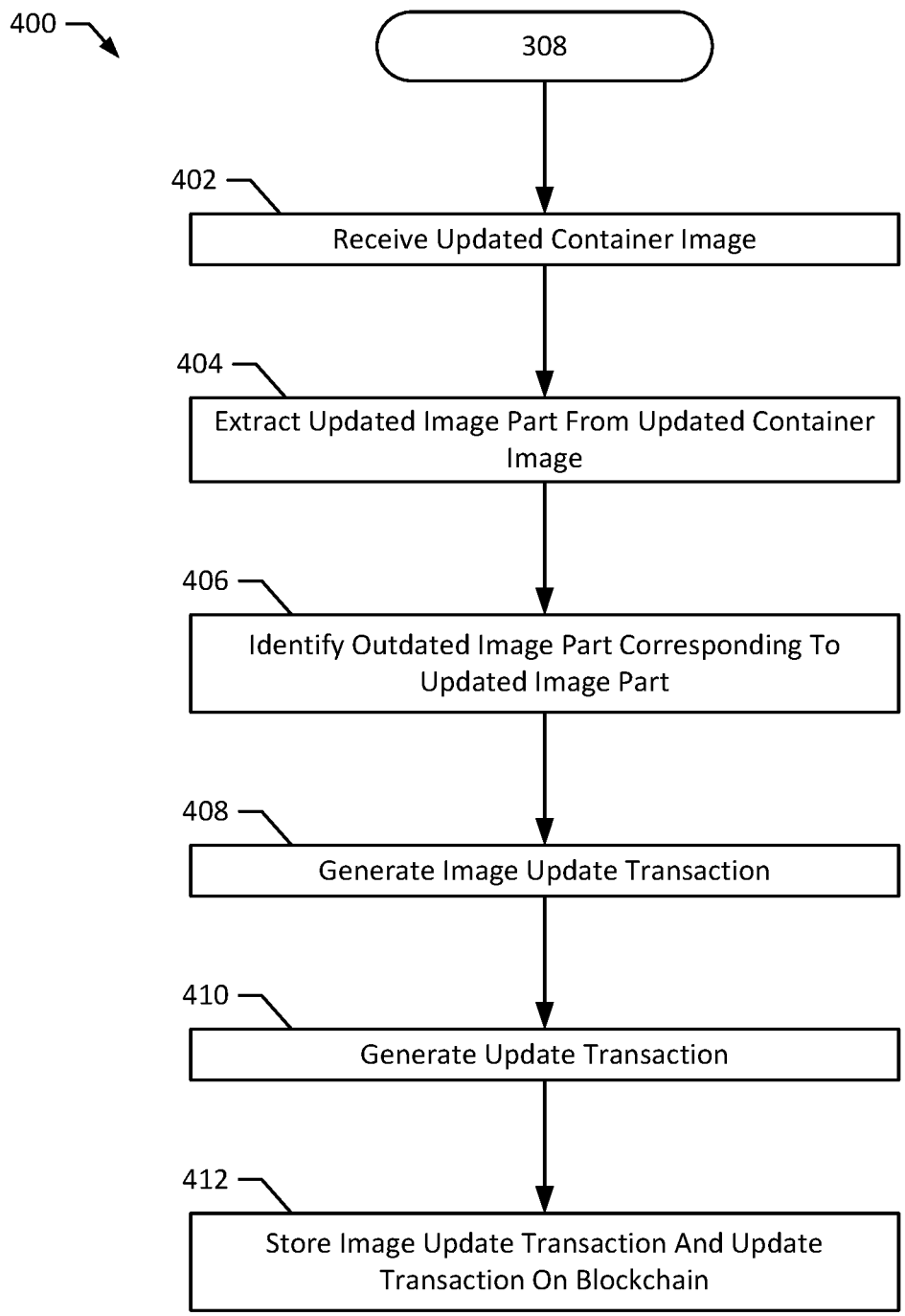
FIGS. 4A-4C illustrate methods according to exemplary embodiments of the present disclosure.
Figure 4B:
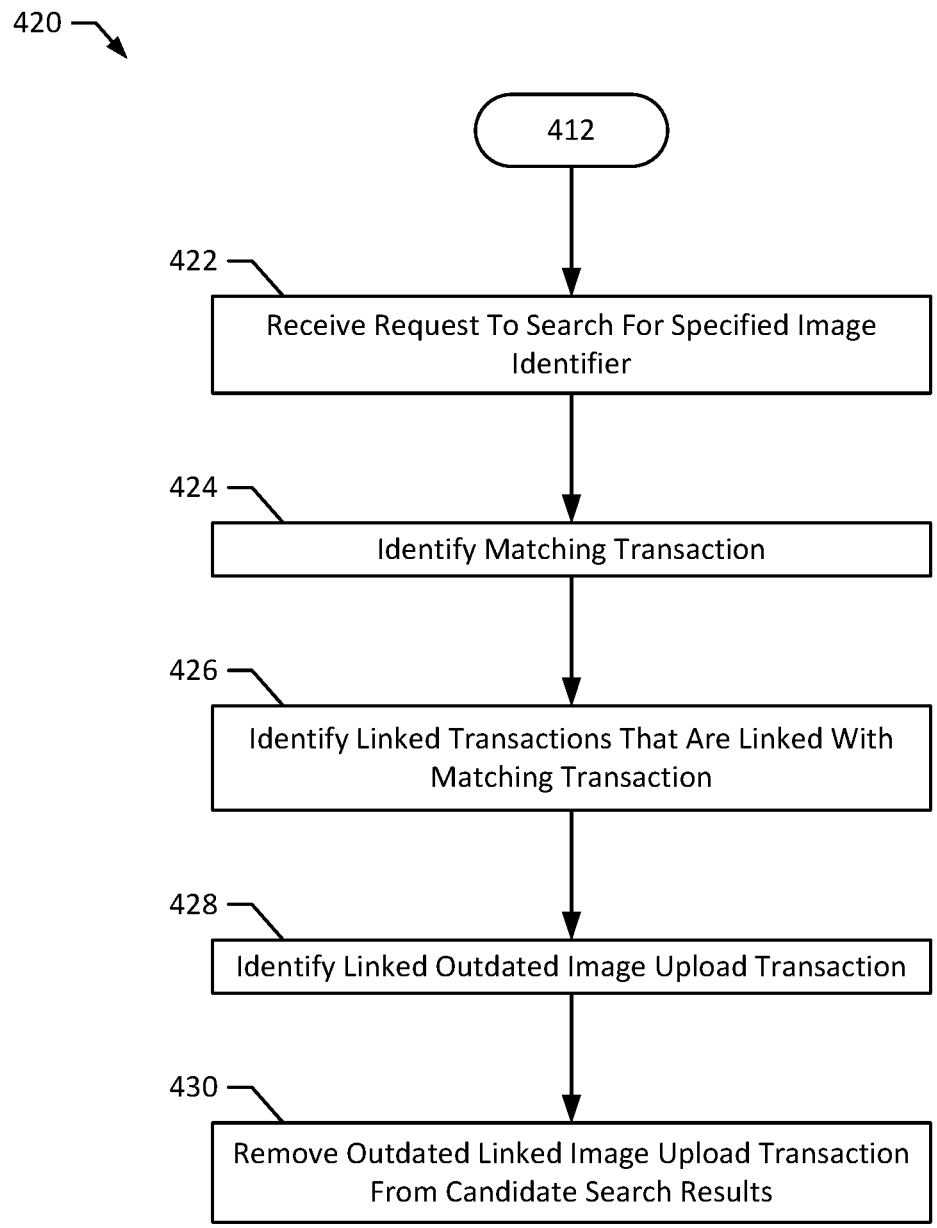
Figure 4C:
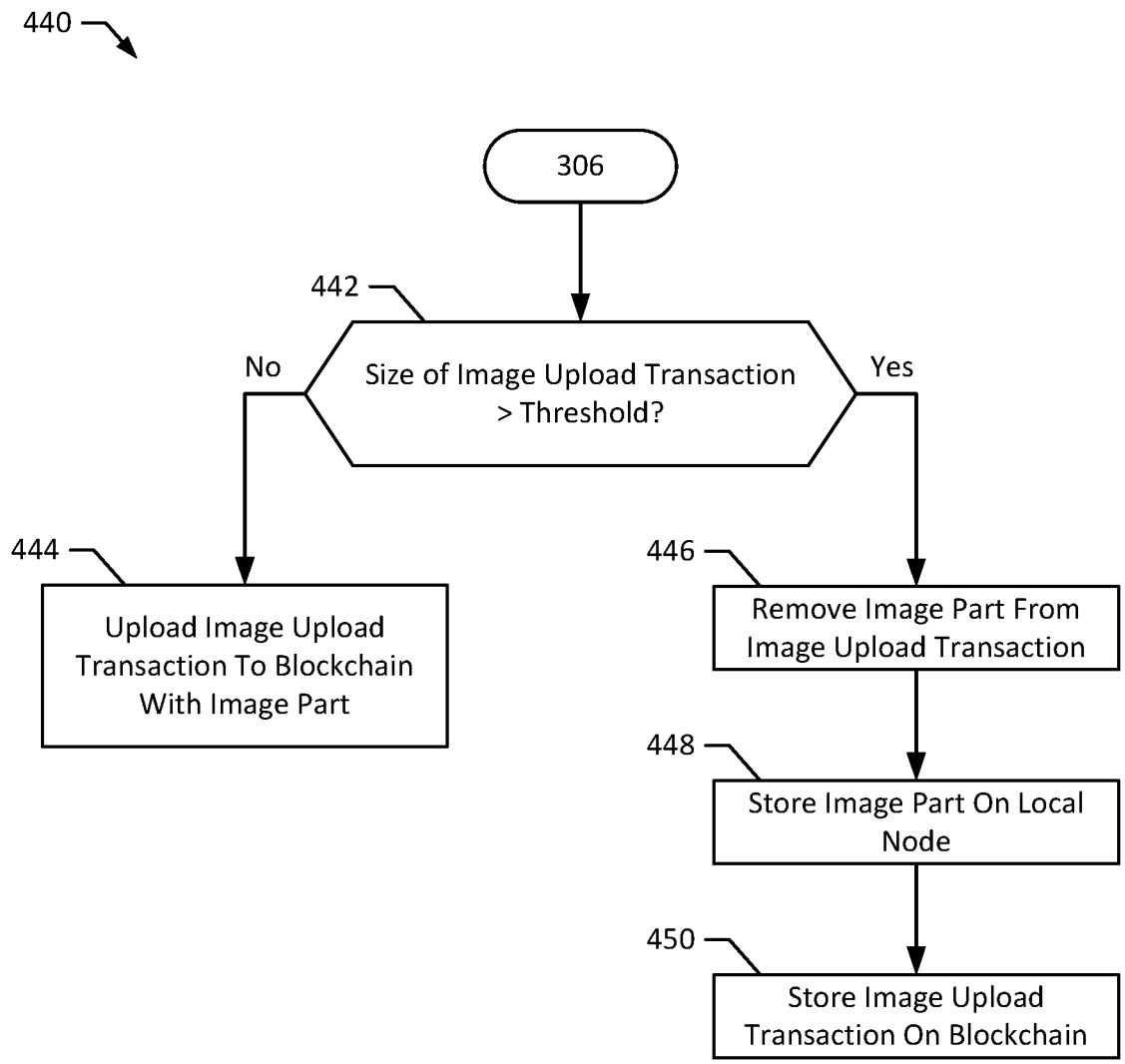

FIGS. 4A-4C illustrate methods 400, 420, 440 according to exemplary embodiments of the present disclosure. The methods 400, 420, 440 may be implemented on a computer system, such as the system 100. For example, the methods 400, 420, 440 may be implemented by the container storage engine 102, the registry 152, and the blockchain 162. The methods 400, 420, 440 may also be implemented by a set of instructions stored on a computer readable medium that, when executed by a processor, cause the computer system to perform the method. For example, all or part of the methods 400, 420, 440 may be implemented by the CPU 148 and the memory 150. Although the examples below are described with reference to the flowchart illustrated in FIGS. 4A-4C, many other methods of performing the acts associated with FIGS. 4A-4C may be used. For example, the order of some of the blocks may be changed, certain blocks may be combined with other blocks, one or more of the blocks may be repeated, and some of the blocks described may be optional.

The method 400 may be performed to store an updated container image on the blockchain. For example the container storage engine 102 may perform the method 410 to store an updated container image 114 on the blockchain 162 after initially storing image upload transactions 128, 134, 214, 220, 226, 232 corresponding to a container 104, 202 on the blockchain 162 (e.g., after block 308). The method 400 begins with receiving an updated container image (block 402). For example, the container storage engine 102 may receive the updated container image 114 according in similar was as discussed above with block 302 (e.g., via the registry 152 and/or from a user). In certain implementations, the updated container image 114 may identify a corresponding container image 104 that the updated container image 114 replaces.

An updated image part may then be extracted form the updated container image (block 404). For example, the container storage engine 102 may identify and extract an updated image part 116 from the updated container image 114. In certain implementations, the container storage engine 102 may compare the updated container image 114 to a corresponding container image 104 to identify one or more updated image parts 116 that differ from corresponding image parts 106, 110 of the container image 104. For example, the updated container image 114 may be divided into image parts using techniques similar to those discussed above with block 304. The image parts of the updated container image 114 may then be compared with those of the container image 104. Any image parts within the updated container image 114 that differ from corresponding image parts 106, 110 of the container image 104 may then be identified as updated container images 116. For example, the updated image part 116 may be identified because the updated executable code 118 differs from the executable code 108 of the image part 106. In certain implementations, the updated container image 114 may be compared to the container image 104 before dividing the updated container image 114 into image parts. For example, each line of code, data, or other information stored within the updated container image 114 may be compared to a corresponding portion of the container image 104. Any lines or portions that differ between the container image 104 and the updated container image 114 may then be identified as updated. The updated lines or portions of the updated container image 114 may then be identified as the updated image part 116. In other implementations, the updated container image 114 may be divided into image parts as discussed above, and the update image part 116 may be identified as the one or more image parts containing the updated lines or portions. In still further implementations, the updated container image 114 may identify the update image part 116 (e.g., the corresponding blob of the updated container image 114 may include an indication that the blob has been updated). Once the updated image part 116 has been identified within the updated container image 114, it may be extracted by copying the updated image part 116 from the updated container image 114.

An outdated image part corresponding to the updated image part may be identified (block 406). For example, the container storage engine 102 may identify an outdated image part of the container image 104 corresponding to the updated container image 114 and the updated image part 116. The outdated image part may be identified based on an image part ordering 212. For example, if the updated image part 116 is the first image part of the updated container image 114, the outdated image part may be identified as the first image part 106 of the container image 104. In additional or alternative implementations, the outdated image part may be identified by comparing the image parts 110 within the updated container image 114 that have not been updated. For example, the updated container image 114 and the container image 104 both include image part 110, which is not updated. Therefore, the outdated image part may be identified as the image part 106 because it does not include a corresponding, unchanged image part in the updated container image 114.

An image update transaction may also be generated (block 408). For example, the container storage engine 102 may generate an image update transaction 140. As discussed above, the image update transaction 140 may be generated to include one or both of the updated image part 116 and a unique identifier 144, which may be generated to link the image update transaction 140 to a preceding image upload transaction 128, 134 using techniques similar to those discussed above with FIG. 2. In particular, the unique identifier 144 may be generated to link the image update transaction to one of the image upload transactions 128, 134 storing at least a portion of the corresponding container image 104.

An update transaction may be generated as well (block 410). For example, the container storage engine 102 may generate an update transaction 145 identifying an outdated transaction or image part 106, 110 replaced by the updated image part 116 of the updated container image 114. In particular, and as discussed above, the update transaction 145 may include an outdated image part identifier 147 identifying the outdated image part 106 identified at block 406. The outdated image part identifier 147 may include an identifier of the container image 104 and an identifier of the outdated image part 106 within the container image 104. For example, the outdated image part identifier 147 may identify the outdated image part 106 as the first image part in the container image 104 according to an image part ordering. In other implementations, the image parts 106, 110 may include individual, unique identifiers and the outdated image part identifier 146 may identify the outdated image part 106 according to the corresponding unique identifier. In still further implementations, the update transaction 145 may additionally or alternatively include an outdated transaction identifier 146. The outdated transaction identifier 146 may identify an image upload transaction 134 or preceding image update transaction 140 storing the outdated image part 106. For example, the outdated transaction identifier 146 may identify the image upload transaction 128 as outdated because the image upload transaction 128 stores the outdated image part 106. In certain implementations, each transaction 128, 134, 140, 145 may have a corresponding identifier (e.g., a hash generated upon storing the transaction 128, 134, 140, 145 on the blockchain 162 and/or a transaction identifier generated by the container storage engine 102 upon storage on the blockchain and included within the transaction 128, 134, 140, 145). In such instances, the corresponding identifier may be included as the outdated transaction identifier 146. In certain implementations, blocks 408 and 410 may be combined (e.g., including one or more of the outdated transaction identifier 146 and the outdated image part identifier 147 in the image update transaction 140).

The image update transaction and the update transaction may then up stored on a blockchain (block 412). For example, the container storage engine 102 may store the image update transaction 140 and the update transaction 145 on the blockchain 162 using techniques similar to those discussed above (e.g., by transmitting the image update transaction 140 and the update transaction 145 to nodes 172, 174, 176 for validation and storage). In certain implementations, the image update transaction 140 and the update transaction 145 may be stored together (e.g., may be transmitted to the nodes 172, 174, 176 at the same time). In other implementations, the image update transaction 140 and the update transaction 145 may be stored separately. For example, the image update transaction 140 may be transmitted for storage before the update transaction 145. In particular, in such instances, the image update transaction 140 may be transmitted to the nodes 172, 174, 176 for storage after the image update transaction 140 is generated at block 408 and before the update transaction 145 is generated at block 410.

In the above examples, the method 400 is discussed as being performed in response to receiving an updated container image 114 corresponding to a container image 104. It should be understood, however, that the method 400 may be performed in response to receiving an updated container image 114 that corresponds to a previous updated container image 114 (e.g., an updated version of a previously-updated container image). In such instances, techniques similar to those discussed above may be utilized, although such techniques may be applied to the corresponding, previously-updated container image instead of a container image 104.

The method 420 may be performed to identify image upload transactions 128, 134, 214, 220, 226, 232 and/or image update transactions 140 stored on the blockchain 162 corresponding to one or more desired container images 104, 202 and/or updated container images 114. In particular, the method 420 may be performed after image update transactions and/or update transactions are stored on the blockchain 162 (e.g., after the completion of block 412). The method 420 may begin with receiving a request to search for a specified image identifier (block 422). For example, the container storage engine 102 may receive a request from a user to search for a specified image identifier. The specified image identifier may indicate one or more identifying quantities corresponding to a container image 104, 202 or updated container image 202. For example, the specified image identifier may indicate one or more of a name, creating individual or organization, storing individual or organization, relevant computing environment (e.g., operating system, computing device), performed functions, and/or ratings of a container image 104, 202 and/or updated container image 114.

A matching transaction may then be identified (block 424). For example, the container storage engine 102 may identify at least one matching transaction that matches one or more of the specified image identifiers. The matching transaction may be identified from among the transactions stored on the blockchain 162. For example, the transactions 128, 134, 140, and 145 may be stored on the blockchain 162 (e.g., after completion of the methods 300, 400). The container image 104 may be configured to execute one or more networking functions for a computer system (e.g., IP address configuration and management) and the updated container image 114 may be an updated version of the container 104 with improved network functionality. In such an example, the image upload transactions 128, 134 corresponding to the container image 104 and the image updated transaction 140 corresponding to the updated container image 114 may include an indication of the performed functions (e.g., a tag or other identifier included within the transactions 128, 134, 140 that indicates that the container image 104 and the updated container image 114 perform networking functions. The specified image identifier may request a search for stored container images 104, 202 and updated container images 114 that perform networking functions. The container storage engine 102 may therefore search the blockchain 162 for transactions that include corresponding indications of network functionality. For example, the container storage engine 102 may analyze all or a subset of transactions stored on the blockchain 162. In certain implementations, for example, the container storage engine 102 may maintain a copy of all transactions stored on the blockchain 162. However, to reduce storage space requirements, the container storage information may not store the image parts 106, 110 or the updated image parts 116. The container storage engine 102 may then search the copy of transactions for transactions containing the specified image identifier (e.g., storing an indication that the corresponding container image 104, 202 and/or updated container image 114 performs networking functions). In performing such a search in the previous example, the container storage engine 102 may identify all of the transaction 128, 134, 140 containing image parts of the container image 104 and the updated container image 114. These transactions 128, 134, 140 may therefore be considered matching transactions. In other implementations, the container storage engine 102 may only search a subset of the transactions stored on the blockchain 162 (e.g., transactions stored in the last six months, transactions stored in the last year, the last 1,000,000 transactions, the last 100,000 transactions). Such implementations may reduce the search time and improve responsiveness, while also reducing the likelihood that outdated container images are identified as matching transactions. In such implementations, however, only more recent transactions may be identified as matching transactions. For example, the image upload transactions 128, 134 may have been uploaded seven months before receiving the request to search and the image update transaction 140 may have been uploaded three months before. If the container storage engine 102 is configured to search the previous six months of transactions on the blockchain 162, the container storage engine 102 may identify the image update transaction 140 as a matching transaction.

Linked transactions may be identified that are linked with the matching transaction (block 426). For example, the container storage engine 102 may identify linked transactions stored on the blockchain 162 that are linked with the matching transaction. The linked transactions, in combination with the matching transaction may constitute initial candidate search results to the request to search. The linked transactions may be identified using the unique identifiers 132, 138, 144, which may be generated to link transactions as discussed above. Continuing the previous example, where only the image update transaction 140 is identified as the matching transaction, the unique identifier 144 may be generated to link the image update transaction 140 to the image upload transaction 134. Based on the unique identifier 144, the container storage engine 102 may identify the image upload transaction 134 as a linked transaction. The unique identifier 138 of the image upload transaction 134 may be generated to link the image upload transaction 134 to the previous image upload transaction 128, which may therefore also be added as a linked transaction. The container storage engine 102 may thereby identify the image upload transactions 128, 134 as linked transactions linked to the matching transaction (e.g., the image updated transaction 140).

A linked outdated image upload transaction may also be identified (block 428). For example, the container storage engine 102 may identify outdated image upload transactions from among the linked transactions that correspond to a subsequent update transaction invalidating an image part 106, 110 stored by the outdated image upload transaction. The outdated image upload transaction may be identified based on one or more of an outdated transaction identifier 146 or an outdated image part identifier 147 and may store image parts 106, 110 that have been subsequently replaced by one or more update image parts 116. In certain implementations, the outdated transactions may be identified based on an update transaction 145. For example, the update transaction 145 may be identified as a linked transaction of the matching transaction. In particular, the container storage engine 102 may identify the update transaction 145 as a linked transaction based on a unique identifier (not depicted) of the update transaction 145 which may be generated to link the update transaction 145 to its corresponding image update transaction 140 (e.g., the image update transaction storing the associated updated image part 116). As another example, the update transaction may be identified as a linked transaction of the matching transaction based on one or both of the outdated transaction identifier 146 and the outdated image part identifier 147. In particular, after identifying the linked transactions and the matching transaction, the container storage engine 102 may perform another search of the transactions stored on the blockchain 162 for transactions storing identifiers of the linked transactions and the matching transaction and/or storing identifiers of the image parts 106, 110 or the updated image parts 116 stored by the linked transactions and the matching transaction. Such a search may then return any update transactions 145 storing outdated transactions identifiers 146 identifying one or more of the linked transactions and the matching transaction as outdated and/or any update transactions 145 storing outdated image part identifiers 147 identifying corresponding image parts 106, 110 and updated image parts 116 as outdated. Continuing the previous example, based on the update transaction 145, the container storage engine 102 may identify the image upload transaction 128 as an outdated image upload transaction based on, e.g., an outdated transaction identifier 146 identifying the image upload transaction 128 and/or an outdated image part identifier 147 identifying the image part 106 stored within the image upload transaction 128. In other implementations, the outdated transaction identifiers 146 and/or outdated image part identifiers 147 may be included within the image update transactions 140. In such implementations, no further searches may be required, and the container storage engine may identify the outdated transactions based on the identifiers 146, 147 stored within the image update transactions 140. The outdated transactions may also include outdated image update transactions 140 storing updated image parts 116 that have been subsequently replaced by an updated image part 116, which may be identified using techniques similar to those discussed above.

The outdated linked image upload transaction may be removed from among the candidate search results (block 430). For example, the container storage engine 102 may remove the outdated linked image upload transaction from among the candidate search results (e.g., the matching transaction and the linked transactions). In particular, as explained above, the outdated linked image upload transaction may correspond to a subsequent image update transaction 140 invalidating the image part 106, 110 stored within the outdated linked upload transaction. Accordingly, because it is outdated, the outdated linked image upload transaction should not be presented in response to a request to search for container images. Rather, the contents of the outdated linked image upload transaction should be replaced with the contents of the subsequent image update transaction 140. As explained above, by superseding previous image upload transactions 128, 134 storing outdated image parts 106, 110 with image update transactions 140 storing updated image parts 116, the container storage engine 102 may be able to store updated versions of container images without having to store complete copies of updated container images 114. Therefore, by removing the outdated image upload transaction from the candidate search results, the remaining search results may be determined to represent the most recent updated container image 114. Continuing the previous example, the image upload transaction 128 may be removed from the candidate search results transactions 128, 134, 140, leaving the transactions 134, 140 as the search results. In implementations where the outdated transactions also include outdated image update transactions, such outdated image update transactions may also be removed from the candidate search results.

After completing the method 420, the remaining search results may be identified as the most up-to-date version of a desired container image 104 or updated container image 114. For instance, after completing the method 420 in the above-discussed examples, the search results include the image update transaction 140 representing the updated image part 116 and the image upload transaction 134 representing the image part 110. Accordingly, by retrieving the stored contents of these transactions 134, 140 the image part 110 and the updated image part 116 may be retrieved, representing a complete version of the updated container image 114, even though the image upload transaction 134 storing the image part 110 may be stored on a blockchain 162 prior to the creation of the updated container image 114. Such implementations may enable robust transaction searching and retrieval, while also reducing the amount of storage required for storing container images 104 and updated container images 114.

Techniques similar to those discussed above with the method 420 may be used during performance of all or part of other functions of the container storage engine 102. For example, search techniques similar to those of the method 420 may be performed by the container storage engine 102 to, e.g., identify the outdated image part in the block 406 or to identify a container image 104, 202 or previously-updated container image corresponding to a received updated container image 114.

The method 440 may be performed to process image upload transactions 128, 134, 214, 220, 226, 232 whose size exceeds a predetermined threshold. For example, the method 440 may be performed while storing the image upload transactions on the blockchain 162 at block 306. The method 440 may begin with determining whether a size of the image upload transaction exceeds a threshold (block 442). For example, after generating an image upload transaction 128, 134, 214, 220, 226, 232 at the block 306, the container storage engine 102 may compare the size of the image upload transaction 128, 134, 214, 220, 226, 232 to a predetermined threshold (e.g., 500 MB, 1 GB). In certain implementations, the container storage engine 102 may compare a size of the entire image upload transaction 128, 134, 214, 220, 226, 232 to the predetermined threshold. In other implementations, the container storage engine 102 may compare a size of the image part 106, 110, 204, 206, 208, 210 stored within the image upload transaction 128, 134, 214, 220, 226, 232 to the predetermined threshold.

If the size of the image upload transaction does not exceed the predetermined threshold, the image upload transaction may be uploaded to the blockchain with its corresponding image parts (block 444). For example, the container storage engine 102 may upload the image upload transaction 128, 134, 214, 220, 226, 232 to the blockchain 162, including its corresponding image part 106, 110, 204, 206, 208, 210. Accordingly, storage of the image upload transaction may proceed according to the techniques discussed above regarding block 308.

If, however, the size of image upload transaction exceeds the predetermined threshold, the image part may be removed from the image upload transaction (block 446). For example, the container storage engine 102 may remove the image part 106, 110, 204, 206, 208, 210 from the image upload transaction 128, 134, 214, 220, 226, 232. The image part 106, 110, 204, 206, 208, 210 may be removed and processed separately (e.g., stored in a different location). In particular, the image part may be stored on a local node (block 448). For example, one of the nodes 172, 174, 176 implementing the blockchain 162 may be associated with the container storage engine 102 (e.g., implemented by the same or an affiliated organization as the container storage engine 102). Such a node 172, 174, 176 may be considered a local node, and the image part 106, 110, 204, 206, 208, 210 may be stored on the local node. In certain implementations, the image part may be stored on the local node as part of an image upload transaction 128, 134, 214, 220, 226, 232. For example, the local node may store a copy of the image upload transaction 128, 134, 214, 220, 226, 232 containing the image part 106, 110, 204, 206, 208, 210. In other implementations, the image part 106, 110, 204, 206, 208, 210 may be stored separately. In such implementations, the image upload transaction 128, 134, 214, 220, 226, 232 from which the image part 106, 110, 204, 206, 208, 210 is removed may be updated with a storage location of the image part 106, 110, 204, 206, 208, 210 within the local node.

The image upload transaction may then be stored on the blockchain (block 450). For example, the container storage engine 102 may upload the image upload transaction 128, 134, 214, 220, 226, 232 to the nodes 172, 174, 176 for verification and storage, as discussed above with the block 308. The image upload transaction 128, 134, 214, 220, 226, 232 may store an indication of the storage location of the image part 106, 110, 204, 206, 208, 210. For example, the storage location may be indicated as an identifier of the local node storing the image part 106, 110, 204, 206, 208, 210 and/or a storage location within the local node. The image upload transaction 128, 134, 214, 220, 226, 232 uploaded for storage on the blockchain 162 may be smaller in size due to the removal of the image part 106, 110, 204, 206, 208, 210.

In certain implementations, rather than storing the image part on a local node, the container storage engine 102 may instead divide the image part 106, 110, 204, 206, 208, 210 into two or more, smaller image parts. Each of the divided image parts may then be added to separate image upload transactions 128, 134, 214, 220, 226, 232 which are then stored on the blockchain.

Performing the method 440, and storing image upload transactions 128, 134, 214, 220, 226, 232 exceeding the size threshold in the manner discussed above may reduce the overall cost of storing container images 104, 202 and updated container images 114 on the blockchain 162. For example, in implementations where initial fees are paid for storage of transactions on the blockchain 162, removing the image part 106, 110, 204, 206, 208, 210 may therefore reduce the initial fees, and overall cost) of storing the container image 104, 202 and/or the updated container image 114 on the blockchain 162. Although the image parts 106, 110, 204, 206, 208, 210 may not be stored directly on the blockchain 162, because the image parts 106, 110, 204, 206, 208, 210 are stored on a local node communicatively coupled to (e.g., implementing) the blockchain 162, the stored image parts 106, 110, 204, 206, 208, 210 may still be accessible to computing devices accessing the blockchain 162. For example, after receiving an image upload transaction 128, a computing device may determine an address or other location of the local node storing the associated image part and may query the local node for a copy of the image part.

The techniques discussed above with the method 440 may similarly be used to process image update transactions 140. For example, at the block 442, a size of the image update transaction 140 may be compared with the size threshold.

Figure 5:
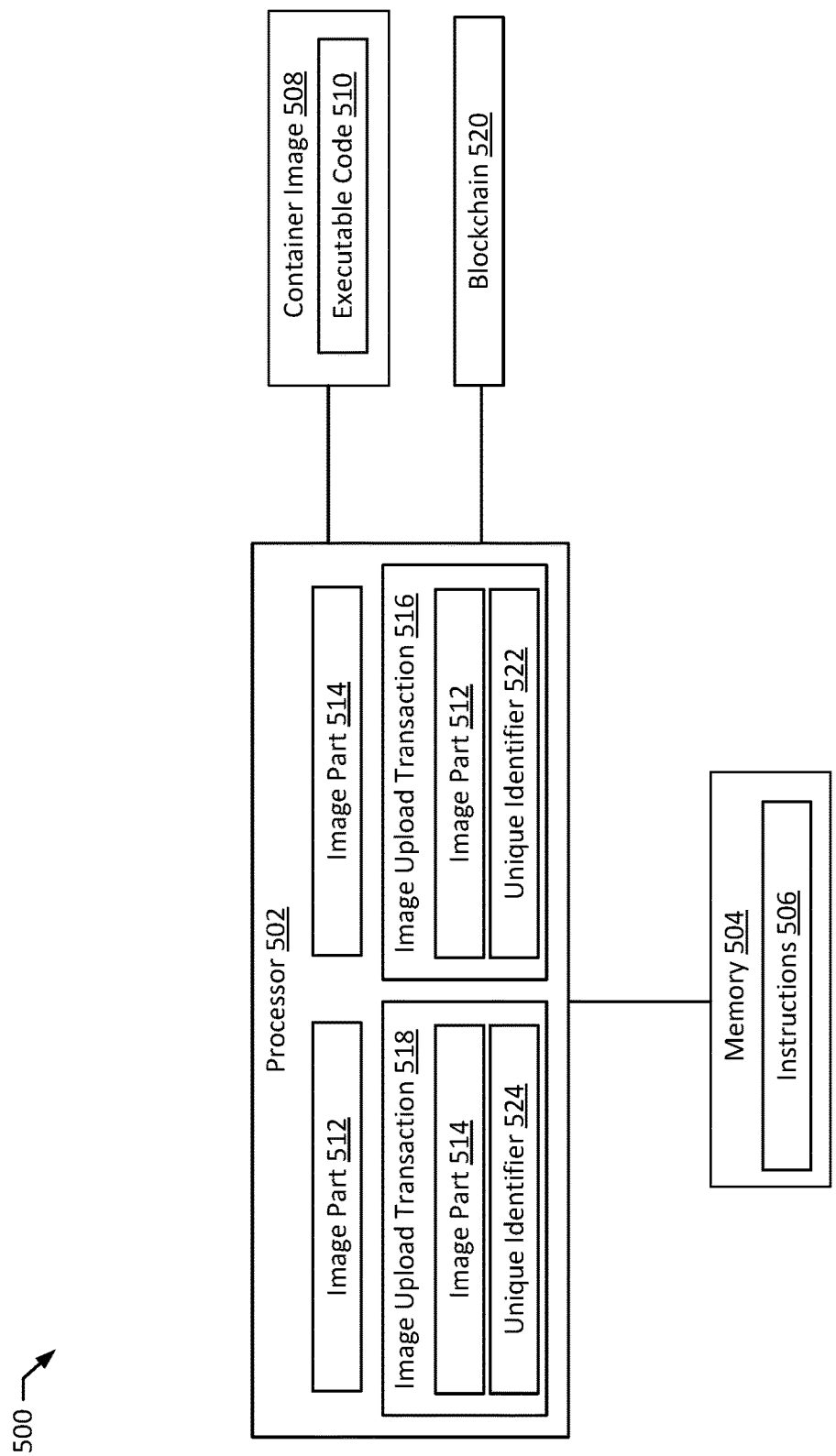
FIG. 5 illustrates a system according to an exemplary embodiment of the present disclosure.

FIG. 5 illustrates a system 500 according to an exemplary embodiment of the present disclosure. The system 500 includes a processor 502 and a memory 504. The memory 504 stores instructions 506 which, when executed by the processor 502, cause the processor 502 to receive a container image 508 including executable code 510 and divide the container image 508 into a plurality of image parts 512, 514. The instructions 506, when executed by the processor 502, further cause the processor 502 to generate a plurality of image upload transactions 516, 518, where each image upload transaction 516, 518 includes at least one image part 512, 514. The instructions 506, when executed by the processor 502, also cause the processor 502 to store the plurality of image upload transactions 516, 518 on a blockchain 520. Each image upload transaction 516, 518 further includes a unique identifier 522, 524 generated to link the image upload transactions 516, 518.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a container image including executable code;
dividing the container image into a plurality of image parts;
generating a plurality of image upload transactions, each image upload transaction including at least one image part;
storing the plurality of image upload transactions on a blockchain;
receiving an updated container image corresponding to the container image and including updated executable code in an updated image part;
identifying an outdated image part of the container image corresponding to the updated image part;
generating a single update transaction that is linked to at least one of the plurality of image upload transactions and includes the updated image part and an indication of at least one of an outdated image upload transaction or the outdated image part; and
storing the single update transaction on the blockchain,
wherein each image upload transaction includes a unique identifier generated to link the plurality of image upload transactions.

2. The method of claim 1, wherein the image parts are ordered within the container image according to an image part ordering, and
wherein each image upload transaction contains an order identifier for a corresponding image part within the image part ordering.

3. The method of claim 2, wherein the unique identifier includes a hash generated to cryptographically link the image upload transactions.

4. The method of claim 3, wherein the hash for a first image upload transaction storing a first image part according to the image part ordering is generated based on contents of the first image upload transaction, and
wherein hashes generated for each subsequent image upload transaction including subsequent image parts according to the image part ordering are generated based on contents of the subsequent image upload transaction and the hash of a preceding image upload transaction corresponding to a previous image part according to the image part ordering.

5. The method of claim 1, wherein the outdated image upload transaction includes the outdated image part.

6. The method of claim 1, wherein the image upload transactions and the single update transaction include an image identifier of the container image, and further comprising:
receiving a request to search for a specified image identifier;
identifying, from among a plurality of transactions stored on the blockchain, a matching transaction including the specified image identifier, wherein the matching transaction is at least one of an image upload transaction and an update transaction;
identifying linked transactions that are linked with the matching transaction, wherein the linked transactions include one or more image upload transactions and at least one update transaction, and wherein the matching transaction and the linked transactions comprise candidate search results for presentation in response to the request;
identifying, within the candidate search results, a linked outdated image upload transaction that corresponds to an update transaction invalidating an outdated linked image part associated with the linked outdated image upload transaction; and
removing the outdated linked image upload transaction from the candidate search results.

7. The method of claim 1, further comprising:
generating a registry creation transaction that includes a registry identifier; and
storing the registry creation transaction on the blockchain before generating the plurality of image upload transactions,
wherein at least one of the plurality of image upload transactions includes the registry identifier.

8. The method of claim 7, wherein the registry identifier includes a registry address specifying a storage location for container images associated with the registry.

9. The method of claim 1, wherein the blockchain is implemented by a plurality of nodes, including a local node, and the method further comprises, for each of at least a subset of the plurality of image upload transactions:
determining whether a size of the image upload transaction exceeds a predetermined threshold;
responsive to determining that the size of the image upload transaction does not exceed the predetermined threshold, uploading the image upload transaction, including the image part, to the blockchain for storage by at least a subset of the nodes; and
responsive to determining that the size of the container image exceeds the predetermined threshold:
removing the image part from the image upload transaction;
storing the image part on the local node; and
storing the image upload transaction on the blockchain.

10. The method of claim 1, wherein the plurality of image parts are blobs created when building the container image.

11. The method of claim 1, wherein the image parts are ordered within the container image according to an image part ordering, and
wherein the unique identifier identifies a first image upload transaction including a first container image according to the image part ordering.

12. A system comprising:
a processor; and a memory storing instructions which, when executed by the processor, cause the processor to:
  receive a container image including executable code;
  divide the container image into a plurality of image parts;
  generate a plurality of image upload transactions, each image upload transaction including at least one image part;
  store the plurality of image upload transactions on a blockchain;
  receive an updated container image corresponding to the container image and including updated executable code in an updated image part;
  identify an outdated image part of the container image corresponding to the updated image part;
  generate a single update transaction that is linked to at least one of the plurality of image upload transactions and includes the updated image part and an indication of at least one of an outdated image upload transaction or the outdated image part; and
  store the single update transaction on the blockchain,
  wherein each image upload transaction includes a unique identifier generated to link the image upload transactions.

13. The system of claim 12, wherein the image parts are ordered within the container image according to an image part ordering,
  wherein each image upload transaction contains an order identifier for a corresponding image part within the image part ordering,
  wherein the unique identifier includes a hash generated to cryptographically link the image upload transactions,
  wherein the hash for a first image upload transaction storing a first image part according to the image part ordering is generated based on contents of the first image upload transaction, and
  wherein hashes generated for each subsequent image upload transaction including subsequent image parts according to the image part ordering are generated based on contents of the subsequent image upload transaction and the hash of a preceding image upload transaction including a previous image part according to the image part ordering.

14. The system of claim 12, wherein the image upload transactions and the single update transaction include an image identifier of the container image, and wherein the memory stores further instructions which, when executed by the processor, cause the processor to:
  receive a request to search for a specified image identifier;
  identify, from among a plurality of transactions stored on the blockchain, a matching transaction including the specified image identifier, wherein the matching transaction is at least one of an image upload transaction and an update transaction;
  identify linked transactions that are linked with the matching transaction, wherein the linked transactions include one or more image upload transactions and at least one update transaction, and wherein the matching transaction and the linked transactions comprise candidate search results for presentation in response to the request;
  identify, within the candidate search results, a linked outdated image upload transaction that corresponds to an update transaction invalidating an outdated linked image part associated with the linked outdated image upload transaction; and
  remove the outdated linked image upload transaction from the candidate search results.

15. The system of claim 12, wherein the memory contains further instructions which, when executed by the processor, cause the processor to:
  generate a registry creation transaction that includes a registry identifier; and
  store the registry creation transaction on the blockchain before generating the plurality of image upload transactions,
  wherein at least one of the plurality of image upload transactions includes the registry identifier.

16. The system of claim 12, wherein the blockchain is implemented by a plurality of nodes, including a local node, and wherein the memory contains further instructions which, when executed by the processor, cause the processor, for each of at least a subset of the plurality of image upload transactions, to:
  determine whether a size of the image upload transaction exceeds a predetermined threshold;
  responsive to determining that the size of the image upload transaction does not exceed the predetermined threshold, uploading the image upload transaction, including the image part, to the blockchain for storage by at least a subset of the nodes; and
  responsive to determining that the size of the container image exceeds the predetermined threshold:
    remove the image part from the image upload transaction;
    store the image part on the local node; and
    store the image upload transaction on the blockchain.

17. The system of claim 12, wherein the image parts are ordered within the container image according to an image part ordering, and
  wherein the unique identifier identifiers a first image upload transaction including a first container image according to the image part ordering.

18. A non-transitory, computer-readable medium storing instructions which, when executed by a processor, cause the processor to:
  receive a container image including executable code;
  divide the container image into a plurality of image parts;
  generate a plurality of image upload transactions, each image upload transaction including at least one image part; and
  store the plurality of image upload transactions on a blockchain;
  receive an updated container image corresponding to the container image and including updated executable code in an updated image part;
  identify an outdated image part of the container image corresponding to the updated image part;
  generate a single update transaction that is linked to at least one of the plurality of image upload transactions and includes the updated image part and an indication of at least one of an outdated image upload transaction or the outdated image part; and
  store the single update transaction on the blockchain,
  wherein each image upload transaction includes a unique identifier generated to link the image upload transactions.

* * * * *